(12) United States Patent
Tam

(10) Patent No.: US 8,838,589 B1
(45) Date of Patent: Sep. 16, 2014

(54) TECHNIQUE FOR BUILDING A USER PROFILE BASED ON CONTENT CONSUMPTION OR PRODUCTION

(75) Inventor: Anthony L. Tam, Palo Alto, CA (US)

(73) Assignee: Reverb Technologies, Inc., San Mateo, CA (US)

( * ) Notice: Subject to any disclaimer, the term of this patent is extended or adjusted under 35 U.S.C. 154(b) by 8 days.

(21) Appl. No.: 13/587,753

(22) Filed: Aug. 16, 2012

Related U.S. Application Data

(60) Provisional application No. 61/525,615, filed on Aug. 19, 2011.

(51) Int. Cl.
*G06F 7/00* (2006.01)
*G06F 17/30* (2006.01)

(52) U.S. Cl.
USPC .......................................................... 707/732

(58) Field of Classification Search
USPC ......... 707/706, 722, 732, 737, 741, 748, 752, 707/754, 758, 769, 771, 780
See application file for complete search history.

(56) References Cited

U.S. PATENT DOCUMENTS

| 6,751,614 | B1 | 6/2004 | Rao | |
|---|---|---|---|---|
| 7,529,731 | B2 * | 5/2009 | Bier | 1/1 |
| 7,870,151 | B2 * | 1/2011 | Mayer et al. | 707/780 |
| 8,407,164 | B2 * | 3/2013 | Malik et al. | 706/12 |
| 8,463,774 | B1 * | 6/2013 | Buron et al. | 707/724 |
| 2006/0064431 | A1 * | 3/2006 | Kishore et al. | 707/102 |
| 2007/0150465 | A1 * | 6/2007 | Brave et al. | 707/5 |
| 2009/0216696 | A1 * | 8/2009 | Downs et al. | 706/20 |
| 2010/0070448 | A1 * | 3/2010 | Omoigui | 706/47 |
| 2010/0100607 | A1 * | 4/2010 | Scholz et al. | 709/219 |
| 2010/0153324 | A1 * | 6/2010 | Downs et al. | 706/21 |
| 2010/0169343 | A1 * | 7/2010 | Kenedy et al. | 707/758 |
| 2010/0235313 | A1 * | 9/2010 | Rea et al. | 706/52 |
| 2010/0306249 | A1 * | 12/2010 | Hill et al. | 707/769 |
| 2011/0125767 | A1 * | 5/2011 | Moritz et al. | 707/754 |
| 2011/0184960 | A1 * | 7/2011 | Delpha et al. | 707/754 |
| 2011/0191311 | A1 * | 8/2011 | Polonsky et al. | 707/706 |

* cited by examiner

*Primary Examiner* — Robert Beausoliel, Jr.
*Assistant Examiner* — Nicholas Allen
(74) *Attorney, Agent, or Firm* — James F. Hann; Haynes Beffel & Wolfeld LLP

(57) ABSTRACT

A method develops a user profile to indicate a user's topics of interest. Documents considered by a computer system to have been consumed by first user are identified. Document summaries are developed identifying concepts represented in each document and relative strength by which the concept is considered associated with the document, and are accumulated from all the identified documents into a profile for the first user. The user profile is stored in a user profile database in a storage medium accessible to the computer system. A system develops a user profile to indicate the user's topics of interest by identifying documents consumed by a user with a document summary for each document identifying concepts and their relative strength. Document summaries are accumulated into a profile for first user.

27 Claims, 5 Drawing Sheets

TECHNIQUE FOR BUILDING A USER PROFILE BASED ON CONTENT CONSUMPTION OR PRODUCTION

CROSS-REFERENCE TO OTHER APPLICATIONS

This application claims the benefit of U.S. provisional patent application No. 61/525,615, filed 19 Aug. 2011, and entitled TECHNIQUE FOR BUILDING A USER PROFILE BASED ON CONTENT CONSUMPTION OR PRODUCTION, incorporated by reference herein.

The following US patent applications are incorporated by reference herein: Ser. No. 13/151,088, filed 1 Jun. 2011; Ser. No. 13/486,937, filed 1 Jun. 2012.

BACKGROUND OF THE INVENTION

Content recommendation systems are widely used and are typically of two basic types, collaborative filtering and content-based filtering. Content-based filtering techniques typically require very little user input but are limited in their scope. Collaborative filtering can be much more powerful, but often requires much more information on the user. When end users want to use a content recommendation system, they are often asked to submit or select a list of their interests, so that the system can find relevant content for them. This is time-consuming and often imprecise, since people often select topics they think they should be interested in, rather than topics they actually read about.

BRIEF SUMMARY OF THE INVENTION

A method for developing a user profile for indicating the user's topics of interest includes the following. A plurality of documents considered by a computer system to have been consumed by a first user is identified. For each identified document, a computer system develops a document summary identifying a plurality of concepts considered represented in the document and a relative strength by which the concept is considered associated with the document. A computer system accumulates the document summaries from all the identified documents into a profile for the first user. The user profile is stored in a user profile database in a storage medium accessible to the computer system.

Some examples of the user profile developing method can include one or more the following. The step of identifying a plurality of documents considered by a computer system to have been consumed by a first user can include the step of determining, for each given one of a plurality of documents, a member of the group consisting of: whether the first user has scrolled through the given document, and whether the user remained on the given document for more than a predetermined minimum period of time and less than a predetermined maximum period of time. Each of the plurality of concepts can include, in combination, a normalized term used in the identified document and a usage attribute identifying a way in which the normalized term is used. The step of developing a document summary, for a given identified document, can include the steps of: identifying a plurality of the concepts used in the identified document; scoring a quality of each usage of the identified concepts in the identified document; and developing, in dependence upon the quality scores for each given one of the identified concepts, a feature strength for the concept as used in the identified document, the document summary indicating each of the concepts in the plurality of concepts in conjunction with its feature strength. The step of accumulating the document summaries from all the identified documents into a profile for the first user can include the step of combining, separately for each of at least a plurality the concepts represented in the document summaries, the feature strength for the concept as used in each of the identified documents. The step of accumulating the document summaries from all the identified documents into a profile for the first user can include the step of combining, separately for each of at least a plurality the concepts represented in the document summaries, the relative strengths by which each concept is considered associated with the document. The method can also include the step of storing in the user profile database a user profile for each of a plurality of users in addition to the first user. The method can also include the step of searching a database for documents whose document summaries match a profile determined in dependence upon the user profile. The method can also include the steps of: blending, in accordance with predetermined weights, the user profile for the first user with a document summary for a document currently being consumed by the first user, to develop a blended user profile; and searching a database for documents having document summaries which match a profile determined in dependence upon the blended user profile.

A system for developing a user profile for indicating the user's topics of interest includes a memory and a data processor coupled to the memory. The data processor is configured to do the following. Identify a plurality of documents considered by the system to have been consumed by a first user. For each identified document, develop a document summary identifying a plurality of concepts considered represented in the document and a relative strength by which the concept is considered associated with the document. Accumulate the document summaries from all the identified documents into a profile for the first user. Store the user profile in a user profile database in a storage medium accessible to the system.

A method for recommending content to a user is carried out as follows. A user profile is stored in a database, the user profile identifying a plurality of concepts considered of interest to the user, each in conjunction with a relative strength by which the concept is considered of interest to the user. For a document currently being consumed by the user, a current document summary is developed. The current document summary identifies a plurality of concepts considered represented in the document and a relative strength by which each concept is considered associated with the document. The user profile is blended with the current document summary to develop a blended user profile. A database is searched for documents having document summaries which match a profile determined in dependence upon the blended user profile.

Some examples of the content recommending method can include one or more the following. Each of the concepts identified in either the user profile or the current document or both can be identified by a normalized term in combination with a usage attribute identifying a way in which the term is used. The step of developing a current document summary can include the steps of: identifying a plurality of the concepts used in the document currently being consumed; scoring a quality of each usage of the identified concepts in the document currently being consumed; and developing, in dependence upon the quality scores for each given one of the identified concepts, a feature strength for the concept as used in the document currently being consumed, the document summary indicating each of the concepts in the plurality of concepts in conjunction with its feature strength. The step of blending the user profile with the current document summary can include the step of, separately for each given one of a plurality of concepts included in both the user profile and the current document summary, averaging the relative strength identified for the given concept in the user profile with the relative strength identified for the given concept in the current document summary, each weighted by a respective blend factor. The blend factor can be the same for all concepts in the plurality of concepts included in both the user profile and the current document summary. The step of blending the user profile with the current document summary can include the step of, separately for each i'th one of a plurality of concepts included in both the user profile and the current document summary, determining a blended feature strength given by a blend factor F times the relative strength identified for the given concept in the user profile, plus (1−F) times the relative strength identified for the given concept in the current document summary.

Additional examples of the content recommending method can include one or more the following. The method can be used with a pool of candidate resources each having a respective document summary identifying a respective plurality of concepts considered represented in the candidate resource and a relative strength by which each concept is considered associated with the candidate resource, and include the steps of: pruning from the pool each given one of the candidate resources whose first n1 concepts, in order of relative strength in the document summary for the given resource, does not match the first $n_1$ concepts identified in the blended user profile in order of relative strength in the blended user profile; and presenting towards the user a list of resources in dependence upon the pruned pool, where n1 is a predetermined positive integer. The step of presenting to the user a list of resources in dependence upon the pruned pool can include the steps of: further pruning from the pruned pool each particular one of the candidate resources whose next n2 concepts, in order of relative strength in the document summary for the given resource, does not match the next n2 concepts identified in the blended user profile in order of relative strength in the blended user profile; and presenting towards the user a list of resources in dependence upon the further pruned pool, where n2 is a predetermined positive integer.

Further examples of the content recommending method can include one or more the following. The method can be used with a pool of candidate resources each having a respective document summary identifying a respective plurality of concepts considered represented in the candidate resource and a relative strength by which each concept is considered associated with the candidate resource, and include the steps of: pruning from the pool each given one of the candidate resources whose first $n_i$ concepts, in order of relative strength in the document summary for the given resource, does not match the first $n_i$ concepts identified in the blended user profile in order of relative strength in the blended user profile, where i=1; for sequentially increasing integers i from i=2 until the pool identifies no more than a predetermined maximum number of resources, pruning from the pool each given one of the candidate resources whose next ni concepts, in order of relative strength in the document summary for the given resource, does not match the next $n_i$ concepts identified in the blended user profile in order of relative strength in the blended user profile; and presenting towards the user a list of resources in dependence upon the pruned pool, where each $n_i$ is a respective predetermined positive integer. In some examples $n_i > n_{i-1}$, for each i>1. In some examples each $n_i = 2^i$.

A system for recommending content to a user includes a memory and a data processor coupled to the memory. The data processor is configured to do the following. Store in a database a user profile identifying a plurality of concepts considered of interest to the user, each in conjunction with a relative strength by which the concept is considered of interest to the user. For a document currently being consumed by the user, develop a current document summary identifying a plurality of concepts considered represented in the document and a relative strength by which each concept is considered associated with the document. Blend the user profile with the current document summary to develop a blended user profile. Search a database for documents having document summaries which match a profile determined in dependence upon the blended user profile.

A computer readable storage medium carries a database. The database identifies a user profile for a plurality of users. Each of the user profiles identifies a respective plurality of concepts considered of interest to the user, each in conjunction with a relative strength by which the concept is considered of interest to the user.

In some examples of the computer readable storage medium, each concept is represented in the user profiles by a normalized term in combination with a usage attribute identifying a way in which the term is used.

Other features, aspects and advantages of the present invention can be seen on review the figures, the detailed description, and the claims which follow.

DETAILED DESCRIPTION

Figure 1:
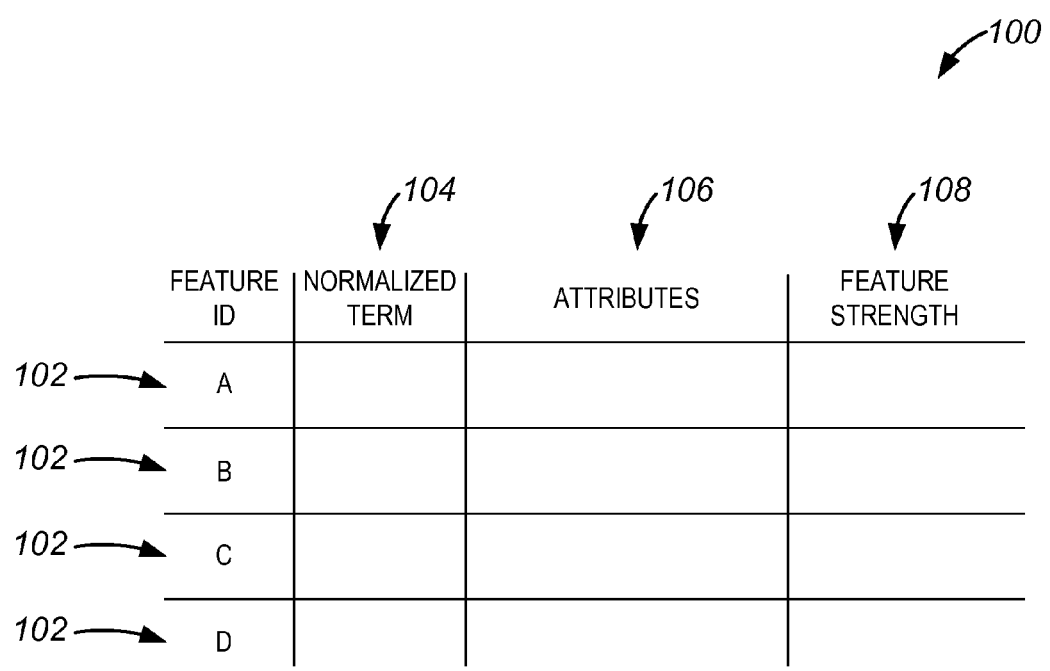
FIG. 1 is an illustration of a feature vector which can be used to store a document summary or a user's profile.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

The present invention is based in part on the recognition that by analyzing the text read or created, by the user, a more precise and relevant model of the user's interest can be created compared to conventional content recommendation systems. This model can be used both to recommend types of text that would be interesting to the end user and to recommend users who produce similar text to each other. The present invention provides better ways to develop and represent a user profile, and better ways to suggest relevant content. A user profile includes a representation of the user's interest as understood by the system. In addition, a profile can include additional information such as names and e-mail addresses, which have nothing to do with a user's interests. In this application content refers to a user-readable document.

The content can be of any text type, including transcripts of audio or video. In various embodiments, the content can be in languages other than English; the users could be individual users or "publishers" (a group blog, a traditional publisher, a newsletter authored by more than one person, and an individual who publishes). The recommendations can be, for example, saved to a reading list or shared to a group. The technique can be used, for example, as part of any kind of browser or reader software, as a stand-alone "tell me what to read/who to follow" application, or as a plug-in to any content-management system for display to end users, or as a plug-into any recommendation system for followers.

The techniques described herein use a feature vector to summarize the concepts featured in each document consumed. What is considered "consumed" is discussed in more detail below but typically a document is considered "consumed" when it has been read or created by the user. These feature vectors are accumulated as documents are consumed, to thereby form the user's profile. When a new document or resource is to be recommended to the user, the system combines or blends the feature vector of the resource currently being consumed by the user, with the user's past history as represented in his or her profile. (The terms 'document' and 'resource' are used interchangeably herein to refer to whatever unit of content the system considers as a unit to be summarized. It could be a single web page, or a book or book chapter, or a particular person's blog or blog entries, and so on.) The system may adjust the blend ratio for optimum results, thereby adjusting the emphasis that the system places on what the user is doing currently, as compared to what the user was interested in historically. The blend ratio typically refers to the weight given to the existing feature vector versus the weight given to the resource currently being consumed. The resulting blended feature vector is then compared to the feature vectors of pre-profiled resources in order to find matching content to recommend to the user.

An aspect of the invention is the way in which document summaries and user profiles are represented. These representations are compatible, to enable one or more (and preferably all) of the following functions:

The compatibility of the representation permits the system to summarize each new document consumed by the user, and accumulate the summary into the user's profile.

The compatibility of the representation permits the system to blend a summary of the user's current content with his or her profile, typically using a simple arithmetic function with weights that can be easily varied to optimize the resulting representation as a predictor of the user's current interest.

The compatibility of the representation permits the system to compare the blended representation with pre-calculated summaries of other documents in order to select those which are most likely to match the user's current interest.

In an embodiment, a document summary represents the concepts addressed in the document, together with a measure of the strength with which the document addresses them. Feature vectors, discussed below with reference to FIG. 1, can be used to store document summaries. Strength describes how likely the term is to be an indicator of what the document is about. For example, a document may discuss the financing of old houses in Palo Alto, Calif. Three concepts represented in the document summary, then, would be 'financing', 'old houses', and 'Palo Alto, Calif.'. The document may be mostly about 'financing', rather than 'old houses' (which, taken out of context, could suggest the document is about remodeling). However, it is desirable to include both concepts in the summary since the intersection of the two concepts more accurately describes the document's subject matter than either one individually. Thus the document summary may include both concepts, but indicate a feature strength for 'financing' which is greater than the feature strength for 'old houses'. The concept 'Palo Alto, Calif.' may be of only minor relevance to the main subject matter of the document, but is nevertheless included in the document summary with a lower feature strength.

The strength measure (also referred to herein as the feature strength) can be calculated based on such metrics as the number of times that a relevant term is used in the document in a way that relates to the concept, and the quality of such usages. In an embodiment, feature strength can be a 'score' that indicates how likely the term is to be an indicator of what the document is about. Such a score can be as described in U.S. patent application Ser. No. 13/151,088, filed 1 Jun. 2011, incorporated by reference herein, and can be calculated using any of the techniques described therein. In a user profile, the feature strength has the same meaning, but determined over the universe of documents consumed by the user rather than over just one document.

FIG. 1 is an illustration of a feature vector 100 which can be used to store a document summary or a user's profile. Feature vector 100 has a plurality of entries 102 (rows in FIG. 1 corresponding to features A-D), each entry 102 indicating a normalized term 104, attributes of its usage 106, and the strength with which it is likely to indicate what the document is about, commonly referred to as the feature strength 108, discussed above. The normalized term 104 is a single identifier which represents the term and all its synonyms. A term can be a single word or it can be a phrase or other combination of words, such as "head of the class." The attributes indicate a way in which the normalized term is used, and can include such attributes as part of speech (such as noun, verb, determiner, noun phrase, or more sophisticated parts of speech such as 'proper noun singular', 'verb gerund or present participle'), word type (such as person, place or organization), or usage mode (such as 'insult'). Together, the normalized term 104 and the attributes 106 indicate a concept addressed in the document, sometimes referred to herein as a "feature" of the document.

Figure 2:
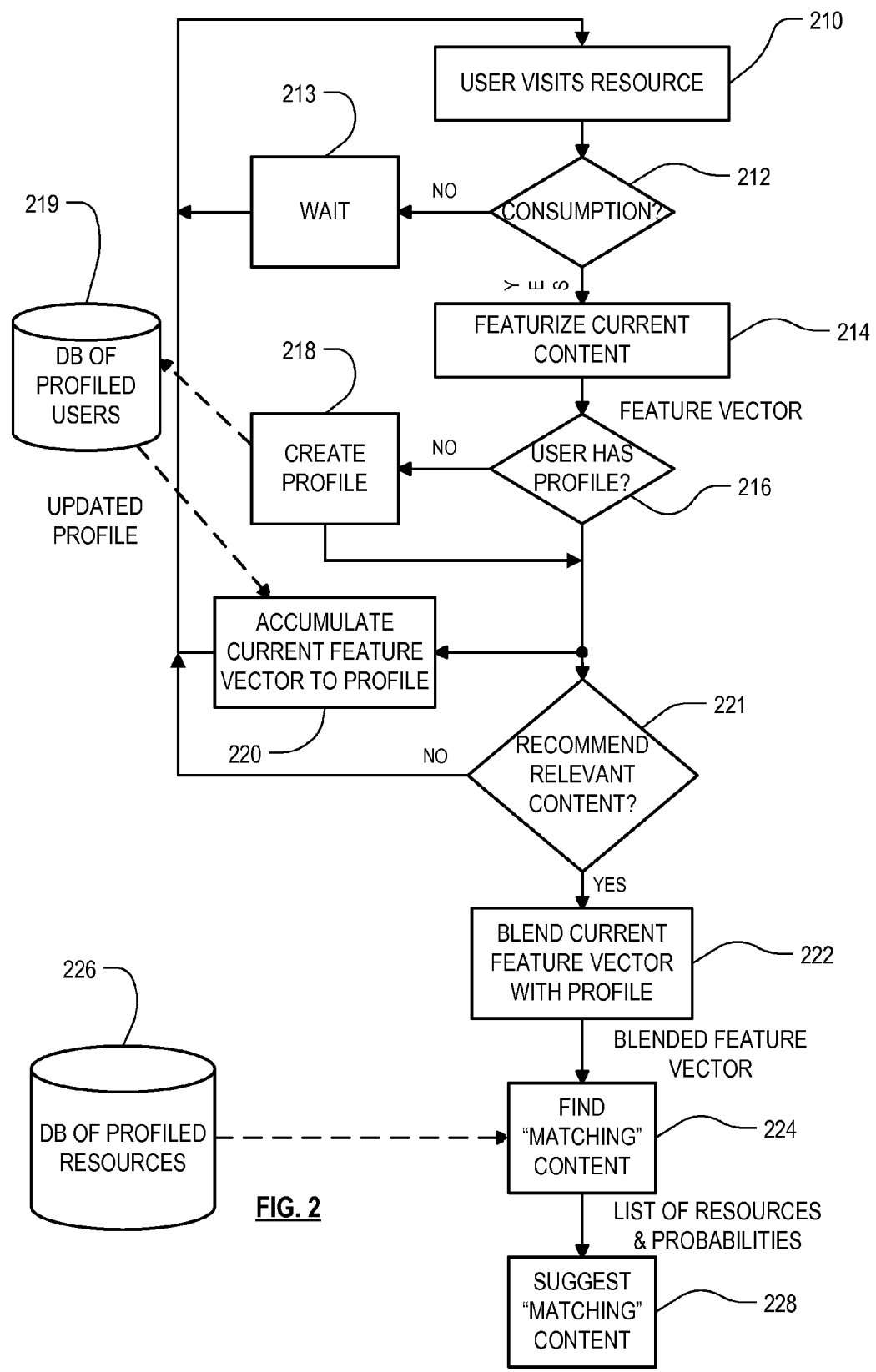
FIG. 2 is a flowchart of an example of how to implement aspects of the invention.

FIG. 2 is a flowchart illustrating an example of how a portion of the system might be constructed to implement aspects of the invention. In step 210, the user visits a resource, such as a Wikipedia article about President George Washington, a news article about a current event, or an eBook about debt financing. In step 212, the system makes a determination of whether the current visit should or should not be considered "consumption" of the resource. This determination avoids adding documents to the user's profile which do not truly indicate the user's interests—such as if the user clicked on a link accidentally. There are many ways to define "consumption". In one embodiment, consumption can be identified by the user scrolling through the document, or the user remaining on the page for more than a minimum period of time (suggesting that the user is reading it) but less than a maximum period of time (which might suggest that the user has walked away or is doing something else). Preferably the consumption determination is a binary one. In another embodiment, however, consumption can be represented as a probability which is then later used derate the document summary as an indicator of the user's interests. If the current user visit to a resource is not considered consumption, then in step 213 the system waits for a time and then returns to step 210. Typically consumption will be used to determine how a document is added to the user profile, and may be stored as the "record of consumption".

If the current user visit is considered to be consumption, then in step 214 the system featurizes the current document content, thereby generating a feature vector 100 such as that shown in FIG. 1. Step 214 is discussed below with reference to FIG. 3. In step 216, the system determines whether the user has a profile, and if not, then in step 218 one is created. Preferably all of the user profiles are held in a database 219 of profiled users. In step 220, the feature vector calculated for the current document is accumulated into the user's profile, yielding an updated profile in database 219. The system then returns to step 210 to await the user's next visit to a resource.

In an embodiment, the "accumulation" into the user's profile is accomplished by simply summing the strength value separately for each feature. For example, if the existing profile contains entries for features A-C, and the feature vector for the current document contains entries for features A, B and D, then accumulation is accomplished by:

adding the strength 108 of feature A from the current feature vector 100 to the strength 108 of feature A in the user's existing profile adding the strength of feature B from the current feature vector to the strength of feature B in the existing profile;

leaving the strength of feature C unchanged in the existing profile;

inserting new feature D into the user's profile with the strength from the current feature vector.

Preferably, all of the feature strength values and the user's profile are normalized for the number of feature vectors that have been accumulated into it. For example, if the profile has been developed over N consumed documents, then each feature strength value is the average, not the sum, of the feature strength values for the corresponding features of all of the consumed documents. Thus, when an (N+1)th document is consumed, which includes a non-zero value for a particular feature (for example feature A), then "accumulation" of the new document summary into the pre-existing profile vector uses the following formula:

new value for feature $A = 1/(N+1)*[(\text{prior value for feature } A \text{ in profile})*N + (\text{value for feature } A \text{ in feature vector for the current document})]$.

This can require many calculations, so in a preferred embodiment, the user profile does contain the actual sums of the feature strength values from all consumed documents, and the total number N of consumed documents represented in the profile is retained separately. The average or normalized value for each of the features in a user profile can then be calculated simply by dividing the value of the profile vector for that feature by N. This calculation can be made only when needed, rather than each time a document is consumed.

It will be appreciated that there are many ways to represent the feature strength in a user profile, beyond the two ways mentioned above. Generally, therefore, it can be said that the user profile "indicates" or "identifies" the feature strengths of each feature in the profile. As used herein "identify" or "identification" of an item of information does not necessarily require the direct specification of that item of information. Information can be "identified" in a field by simply referring to the actual information through one or more layers of indirection, or by identifying one or more items of different information which are together sufficient to determine the actual item of information.

If the system is also recommending relevant content at step 221, then after steps 216 and 218, the system also blends the feature vector for the current document with the user's existing profile (step 222), to yield a blended feature vector. The blended feature vector is an example of what is referred to herein as a blended user profile, which takes into account both the user's profile based on prior consumption, as well as features in a document that the user is consuming currently, indicating very current topics of interest. As discussed below, a blend factor, which indicates the emphasis that the system places on the user's current consumption as compared to his or her prior consumption, can be applied here. Advantageously, since the same form of representation is used to summarize current content as is used for the user's profile, which, in this example, is represented by a feature vector 100, the blending in step 222 can be accomplished in much the same way as accumulation in step 220, except using a blend factor to adjust the influence that each component on the result. For example, if the blend factor is F ($0.0 <= F <= 1.0$), then in the above situation, the resulting feature vector is (A, B, C, D), where:

$A = F*(\text{strength of feature } A \text{ from the current feature vector}) + (1-F)*(\text{strength of feature } A \text{ as indicated in the existing profile});$ $B = F*(\text{strength of feature } B \text{ from the current feature vector}) + (1-F)*(\text{strength of feature } B \text{ as indicated in the existing profile});$ $C = (1-F)*(\text{strength of feature } C \text{ as indicated in the existing profile});$ and $D = F*(\text{strength of feature } D \text{ as indicated from the current feature vector}).$ In some examples the blend factor is arrived at by experimentation; in other embodiments the user can be given an option to choose a value for blend factor F that works best for the user. For example, a blend factor of 0.3 may be suggested for light personalization influence, while a blend factor of 0.7 may be suggested for heavily influencing results based on personal behavior.

In step 224, the system compares the blended feature vector with the feature vectors associated with previously profiled resources in a database 226 of previously profiled resources. As used herein, the term "database" does not necessarily imply any unity of structure. For example, two or more separate databases, when considered together, still constitute a "database" as that term is used herein. Step 224 yields a list of one or more resources from the database 226, together with an indication of the probability with which they would be interesting to the user. For example, probability can be determined using cosine similarity or other numeric/statistical relevance techniques. This list of documents is referred to herein as "matching" documents, and it will be appreciated that this does not mean that the documents have to be identical to the one currently being viewed or to any other particular document. In fact, in an embodiment, perfect matches or very highly matched documents can be removed from the list of matching resources, to avoid suggesting identical, syndicated or repeated content. In step 228, one or more of the remaining resources in the list are presented to the user as suggested relevant content, for example ranked in the order of their probabilities, or grouped by the two or three strongest concepts.

Presentation of suggested relevant content to the user can be accomplished by any mechanism in various embodiments. In one embodiment, the list of resources is presented to the user as a sidebar or a pop-up list on a monitor or smart phone display, with live links. In another embodiment the list is presented sequentially from best-to-worst matches. The list may be communicated to the user via a display connected directly to the same computer system that developed it, for example. In another embodiment it is communicated to the user remotely, for example via HTML. Many other suitable mechanisms will be apparent to the reader.

Figure 3:
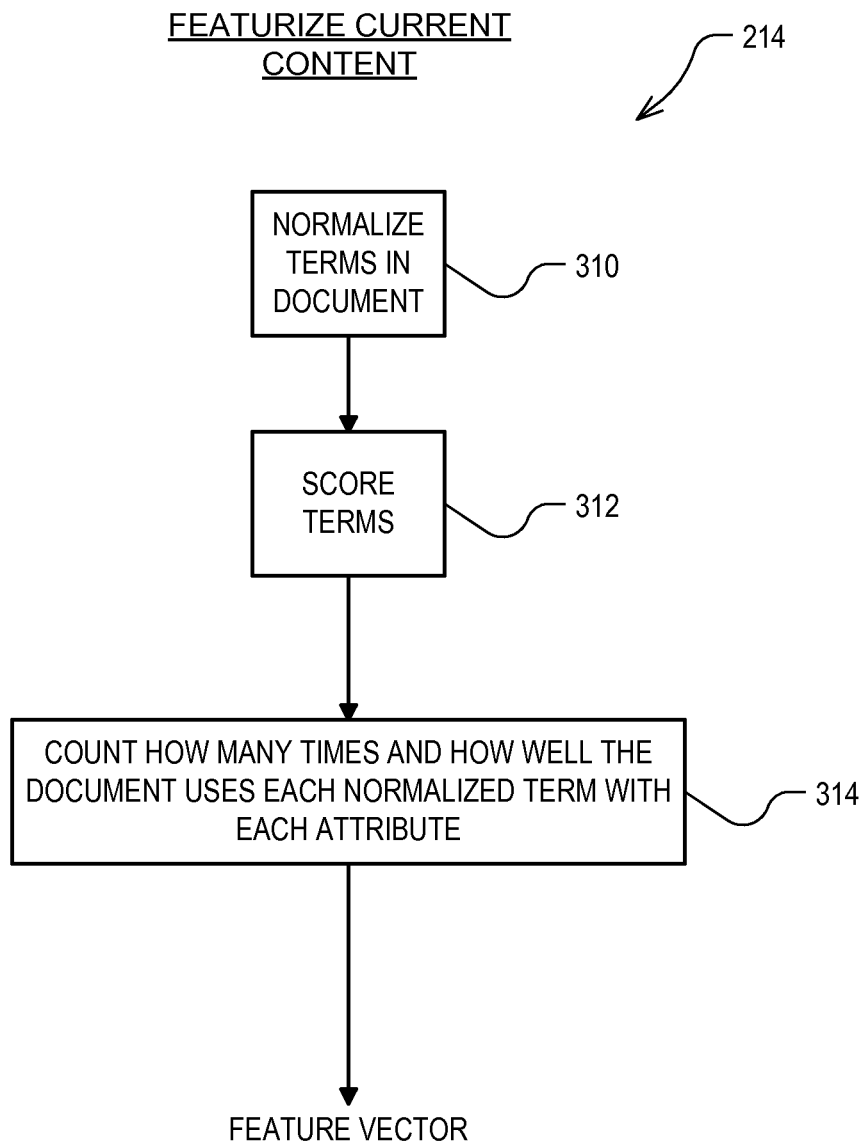
FIG. 3 is a flowchart showing an example of steps used to featurized current content.

FIG. 3 is a flowchart detail of step 214 of FIG. 2, for featurizing the current content. In step 310, the system normalizes the terms of the document by converting all synonyms of a particular word to a common identifier. In step 312, methods like those described in the above-incorporated patent application are used to score the terms to indicate how well each term is used either within a sentence, or within the entire document. This step also identifies the attributes of each usage of the term in the document. Each combination of a normalized term and set of attributes then represents a concept, which is referred to herein as a feature. In step 314, the system counts how many times and how well the document uses each feature, to thereby determined the feature strengths for each of the concepts used in the document. For example, the score for a particular concept may be given by summing over all usages of the feature in the document, a usage quality factor ranging from 0 to 1 for each usage. As shown in FIG. 3, the same method is used to featurize the document currently being consumed as is used to featurize documents for accumulating in the user's profile, so that the two may be blended as set forth above.

Figure 4:
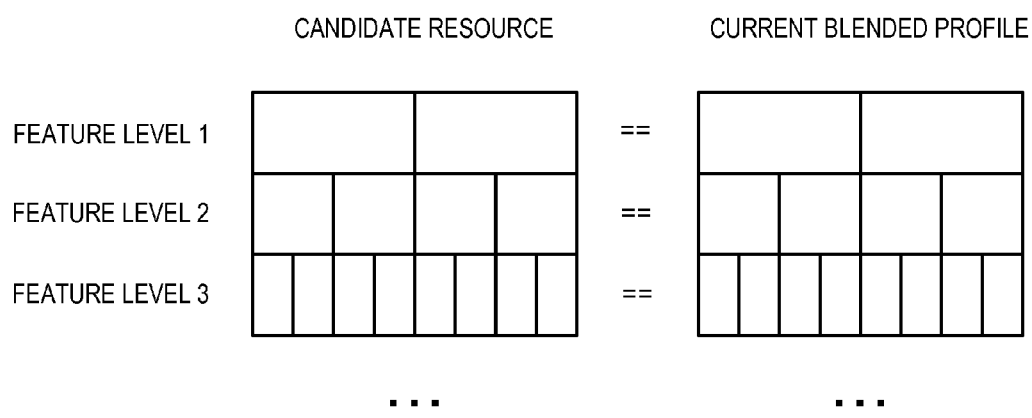
FIG. 4 illustrates the use of feature vectors to find matching content.

FIG. 4 illustrates the use of feature vectors to find matching content. The concepts both in the current blended feature vector (from step 222) and in the candidate resource, which is a document or other resource that step 224 is considering whether to recommend, are first ranked by strength (last column in FIG. 1) and then organized into feature levels. Feature level 1 contains, for example, the two strongest concepts in the current blended profile or in the current candidate resource. Feature level 2 contains, for example, the next four strongest concepts in the current blended profile or in the current candidate resource, and feature level 3 contains, for example, the next eight strongest concepts in the current blended profile or in the current candidate resource, and so on. That is each feature level i contains the next $2^i$ strongest concepts. The use of power-of-two size increases in each level is only one implementation. In another embodiment, the size increases can be different, or two or more of the levels can have equal size or even become smaller with increasing level number.

In general there are N levels, and each level i contains $n_i$ features, for I=1, ... N. The number of levels N may not be the same for all candidate resources, nor does the number of levels N of the current blended profile need to match the number of levels N in any of the candidate resources. However, the number of features $n_i$ in each level i which is filled in a candidate resource for the current blended profile, is the same for all candidate resources and the current blended profile. That is, $n_1$ is the same for all; $n_2$ is the same for all; and so on to at least the last level at which all features contain strength values.

In order to find matches, first the level 1 features of the current blended profile are compared to the level 1 features of the candidate resources, and all those having the same concepts are selected for the list. Viewed alternatively, an initial list (which could be all candidate resources in the database 226) is pruned to eliminate all resources whose level 1 features do not match the level 1 features of the current blended profile. If the list is too long for whatever the system's purpose is, then the system compares the level 2 features of the current blended profile to the level 2 features of the candidate resources in the list of level 1 matches. The list is pruned of all candidate resources whose level 2 features do not match. If the list is still too long, then the level 3 features are compared, and so on, until the list of candidate resources has been pruned to a desirable size. The desirable size will vary depending upon the embodiment. For example, if the system is designed to suggest only one best matching candidate resource, then a list with 2 matches could be considered too long, and the system will continue to prune.

Many variations are possible. As one example, a user can be enabled to adjust his or her profile by deleting documents that do not represent the user's current interests. The text model also can be improved by asking users to rank or rate documents for quality or interest, or by incorporating book reviews or ratings by the user or other users, or by ranking texts based on their popularity (for example as suggested by the number of re-tweets, links, or re-blogs).

As another example, the universe of documents used in a profile can be windowed, such as by including only the most recent 1000 pages consumed, or only those consumed within the last 30 days.

As another example, the database 226 can contain user profiles of different people, rather than summaries of different documents. For example, by means of cookies or other tracking information, or simply from a list of text documents (for instance, from URLs tweeted by a Twitter user, or saved to a bookmarking system, or book titles saved to a system such as Goodreads, or blog posts or tweets associated with a user), the system can crawl and analyze the text (using document clustering, classification, topic modeling, and other techniques) and build a profile of the person based on text consumption and production. Then the system can suggest not other documents, but other authors that write about concepts matching the user's blended feature vector.

As another example, the database 226 can contain profiles of Twitter users, or publishers, or blog collections, in which case relevant Twitter users or publishers or blog collections can be recommended. As another example, the current blended profile can be used to serve ads relevant to the user's current interests.

The system can be implemented using any form of computer system, including a personal computer, a portable computer, a workstation, a computer terminal, a network computer, a mainframe, a server farm, a virtual or physical machine, or any other data processing system or user device. An example is discussed below with reference to FIG. 5, which is a simplified block diagram of a computer system 40 that can be used to implement software incorporating aspects of the present invention. Parts of the system can be tightly integrated with a user's browser, such as with Javascript, or more loosely integrated by way of a browser plug-in. Due to the ever changing nature of computers and networks, the description of these computer systems is intended only as specific examples for purposes of illustrating the preferred embodiments of the present invention. Many other configurations of computer system are possible.

Computer system 40 typically includes a processor subsystem 44 which communicates with a number of peripheral devices via bus subsystem 42. These peripheral devices may include a storage subsystem 54, comprising a memory subsystem 56 and a file storage subsystem 58, user interface input devices 52, user interface output devices 50, and a network interface subsystem 46. The input and output devices allow user interaction with computer system 40. Network interface subsystem 46 provides an interface to outside networks, including an interface to communication network 48, and is coupled via communication network 48 to corresponding interface devices in other computer systems. Communication network 48 may comprise many interconnected computer systems and communication links. These communication links may be wireline links, optical links, wireless links, or any other mechanisms for communication of information, but typically it they are IP-based communication networks. While in one embodiment, communication network 48 is the Internet, in other embodiments, communication network 48 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 52 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 40 or onto computer network 48.

User interface output devices 50 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 40 to the user or to another machine or computer system.

Storage subsystem 54 stores the basic programming and data constructs that provide the functionality of certain embodiments of the present invention. For example, the various modules implementing the functionality of certain embodiments of the invention may be stored in storage subsystem 54. These software modules are generally executed by processor subsystem 44. Database 219 and database 226 are stored here in one embodiment. In other embodiments they may be stored partially or entirely at another location accessible, for example, via communication network 48.

Memory subsystem 56 typically includes a number of memories including a main random access memory (RAM) 60 for storage of instructions and data during program execution and a read only memory (ROM) 62 in which fixed instructions are stored. File storage subsystem 58 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 58. The host memory 56 contains, among other things, computer instructions which, when executed by the processor subsystem 44, cause the computer system to operate or perform functions as described herein. As used herein, processes and software that are said to run in or on "the host" or "the computer", execute on the processor subsystem 44 in response to computer instructions and data in the host memory subsystem 56 including any other local or remote storage for such instructions and data.

Bus subsystem 42 provides a mechanism for letting the various components and subsystems of computer system 40 communicate with each other as intended. Although bus subsystem 42 is shown schematically as a single bus, alternative embodiments of the bus subsystem may use multiple busses.

Figure 5:
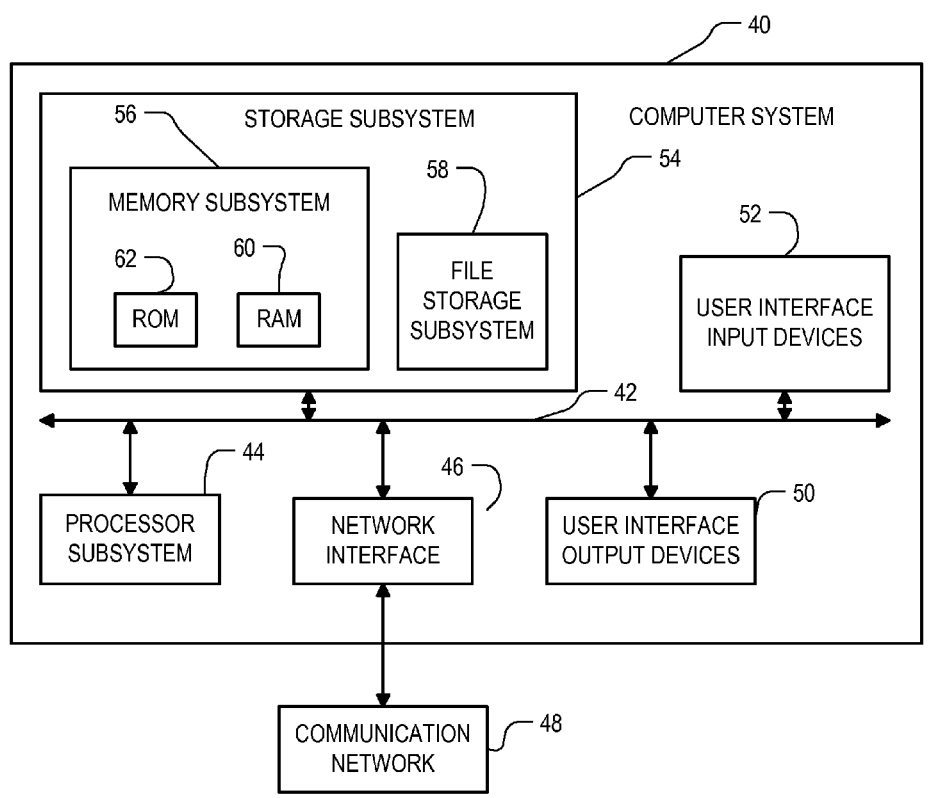
FIG. 5 is a schematic diagram illustrating one example of a computer system for use in carrying out examples of the present invention.

Computer system 40 itself can be of varying types including a personal computer, a portable computer, a workstation, a computer terminal, a network computer, a television, a mainframe, a server farm, or any other data processing system or user device. Due to the ever-changing nature of computers and networks, the description of computer system 40 depicted in FIG. 5 is intended only as a specific example for purposes of illustrating the preferred embodiments of the present invention. Many other configurations of computer system 40 are possible having more or less components than the computer system depicted in FIG. 5.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

Any and all patents, patent applications and printed publications referred to above are incorporated by reference.

What is claimed is:

1. A method for developing a user profile for indicating the user's topics of interest, comprising the steps of:
   identifying a plurality of documents considered by a computer system to have been consumed by a first user;
   for each identified document, a computer system developing a document summary identifying a plurality of concepts considered represented in the document and a relative strength by which the concept is considered associated with the document;
   a computer system accumulating the document summaries from all the identified documents into a profile for the first user; and
   storing the user profile in a user profile database in a storage medium accessible to the computer system,
   wherein each of the plurality of concepts comprises, in combination, a normalized term used in the identified document and a usage attribute identifying a way in which the normalized term is used,
   and wherein the step of developing a document summary, for a given identified document, comprises the steps of:
   identifying a plurality of the concepts used in the identified document;
   scoring a quality of each usage of the identified concepts in the identified document; and
   developing, in dependence upon the quality scores for each given one of the identified concepts, a feature strength for the concept as used in the identified document,
   the document summary indicating each of the concepts in the plurality of concepts in conjunction with its feature strength.

2. A method according to claim 1, wherein the step of identifying a plurality of documents considered by a computer system to have been consumed by a first user, comprises the step of determining, for each given one of a plurality of documents, a member of the group consisting of:
   whether the first user has scrolled through the given document, and
   whether the user remained on the given document for more than a predetermined minimum period of time and less than a predetermined maximum period of time.

3. A method according to claim 1, wherein the step of accumulating the document summaries from all the identified documents into a profile for the first user comprises the step of combining, separately for each of at least a plurality the concepts represented in the document summaries, the feature strength for the concept as used in each of the identified documents.

4. A method according to claim 1, wherein the step of accumulating the document summaries from all the identified documents into a profile for the first user comprises the step of combining, separately for each of at least a plurality the concepts represented in the document summaries, the relative strengths by which each concept is considered associated with the document.

5. A method according to claim 1, further comprising the step of storing in the user profile database a user profile for each of a plurality of users in addition to the first user.

6. A method according to claim 1, further comprising the step of searching a database for documents whose document summaries match a profile determined in dependence upon the user profile.

7. A method according to claim 1, further comprising the steps of:
  blending, in accordance with predetermined weights, the user profile for the first user with a document summary for a document currently being consumed by the first user, to develop a blended user profile; and
  searching a database for documents having document summaries which match a profile determined in dependence upon the blended user profile.

8. A system for developing a user profile for indicating the user's topics of interest, the system comprising:
  memory;
  a data processor coupled to the memory, the data processor configured to:
    identify a plurality of documents considered by the system to have been consumed by a first user;
    for each identified document, develop a document summary identifying a plurality of concepts considered represented in the document and a relative strength by which the concept is considered associated with the document;
    accumulate the document summaries from all the identified documents into a profile for the first user; and
    store the user profile in a user profile database in a storage medium accessible to the system,
  wherein each of the plurality of concepts comprises, in combination, a normalized term used in the identified document and a usage attribute identifying a way in which the normalized term is used,
  and wherein in developing a document summary, for a given identified document, the data processor configured further to:
    identify a plurality of the concepts used in the identified document;
    score a quality of each usage of the identified concepts in the identified document; and
    develop, in dependence upon the quality scores for each given one of the identified concepts, a feature strength for the concept as used in the identified document,
  the document summary indicating each of the concepts in the plurality of concepts in conjunction with its feature strength.

9. A system according to claim 8, wherein the identifying a plurality of documents considered by a computer system to have been consumed by a first user, comprises determining, for each given one of a plurality of documents, a member of the group consisting of:
  whether the first user has scrolled through the given document, and
  whether the user remained on the given document for more than a predetermined minimum period of time and less than a predetermined maximum period of time.

10. A system according to claim 8, wherein accumulating the document summaries from all the identified documents into a profile for the first user comprises combining, separately for each of at least a plurality the concepts represented in the document summaries, the feature strength for the concept as used in each of the identified documents.

11. A system according to claim 8, wherein the data processor is further configured to:
  blend, in accordance with predetermined weights, the user profile for the first user with a document summary for a document currently being consumed by the first user, to develop a blended user profile; and
  search a database for documents having document summaries which match a profile determined in dependence upon the blended user profile.

12. A method for recommending content to a user, comprising:
  storing in a database a user profile identifying a plurality of concepts considered of interest to the user, each in conjunction with a relative strength by which the concept is considered of interest to the user;
  for a document currently being consumed by the user, developing a current document summary identifying a plurality of concepts considered represented in the document and a relative strength by which each concept is considered associated with the document;
  blending the user profile with the current document summary to develop a blended user profile; and
  searching a database for documents having document summaries which match a profile determined in dependence upon the blended user profile,
  wherein the step of developing a current document summary comprises the steps of:
  identifying a plurality of the concepts used in the document currently being consumed;
  scoring a quality of each usage of the identified concepts in the document currently being consumed; and
  developing, in dependence upon the quality scores for each given one of the identified concepts, a feature strength for the concept as used in the document currently being consumed,
  the document summary indicating each of the concepts in the plurality of concepts in conjunction with its feature strength.

13. A method according to claim 12, wherein each of the concepts identified in either the user profile or the current document or both is identified by a normalized term in combination with a usage attribute identifying a way in which the term is used.

14. A method according to claim 12, wherein the step of blending the user profile with the current document summary comprises the step of, separately for each given one of a plurality of concepts included in both the user profile and the current document summary, averaging the relative strength identified for the given concept in the user profile with the relative strength identified for the given concept in the current document summary, each weighted by a respective blend factor.

15. A method according to claim 14, wherein the blend factor is the same for all concepts in the plurality of concepts included in both the user profile and the current document summary.

16. A method according to claim 12, wherein the step of blending the user profile with the current document summary comprises the step of, separately for each i'th one of a plurality of concepts included in both the user profile and the current document summary, determining a blended feature strength given by a blend factor F times the relative strength identified for the given concept in the user profile, plus (1−F) times the relative strength identified for the given concept in the current document summary.

17. A method for recommending content to a user, for use with a pool of candidate resources each having a respective document summary identifying a respective plurality of concepts considered represented in the candidate resource and a relative strength by which each concept is considered associated with the candidate resource, comprising the steps of:
- storing in a database a user profile identifying a plurality of concepts considered of interest to the user, each in conjunction with a relative strength by which the concept is considered of interest to the user;
- for a document currently being consumed by the user, developing a current document summary identifying a plurality of concepts considered represented in the document and a relative strength by which each concept is considered associated with the document;
- blending the user profile with the current document summary to develop a blended user profile;
- searching a database for documents having document summaries which match a profile determined in dependence upon the blended user profile;
- pruning from the pool each given one of the candidate resources whose first $n_1$ concepts, in order of relative strength in the document summary for the given resource, does not match the first $n_1$ concepts identified in the blended user profile in order of relative strength in the blended user profile; and
- presenting towards the user a list of resources in dependence upon the pruned pool,
- where $n_1$ is a predetermined positive integer.

18. A method according to claim 17, wherein the step of presenting to the user a list of resources in dependence upon the pruned pool comprises the steps of:
- further pruning from the pruned pool each particular one of the candidate resources whose next $n_2$ concepts, in order of relative strength in the document summary for the given resource, does not match the next $n_2$ concepts identified in the blended user profile in order of relative strength in the blended user profile; and
- presenting towards the user a list of resources in dependence upon the further pruned pool,
- where $n_2$ is a predetermined positive integer.

19. A method for recommending content to a user, for use with a pool of candidate resources each having a respective document summary identifying a respective plurality of concepts considered represented in the candidate resource and a relative strength by which each concept is considered associated with the candidate resource, comprising the steps of:
- storing in a database a user profile identifying a plurality of concepts considered of interest to the user, each in conjunction with a relative strength by which the concept is considered of interest to the user;
- for a document currently being consumed by the user, developing a current document summary identifying a plurality of concepts considered represented in the document and a relative strength by which each concept is considered associated with the document;
- blending the user profile with the current document summary to develop a blended user profile;
- pruning from the pool each given one of the candidate resources whose first $n_i$ concepts, in order of relative strength in the document summary for the given resource, does not match the first $n_i$ concepts identified in the blended user profile in order of relative strength in the blended user profile, where i=1;
- for sequentially increasing integers i from i=2 until the pool identifies no more than a predetermined maximum number of resources, pruning from the pool each given one of the candidate resources whose next $n_i$ concepts, in order of relative strength in the document summary for the given resource, does not match the next $n_i$ concepts identified in the blended user profile in order of relative strength in the blended user profile; and
- presenting towards the user a list of resources in dependence upon the pruned pool, where each $n_i$ is a respective predetermined positive integer.

20. A method according to claim 19, wherein $n_i > n_{i-1}$, for each i>1.

21. A method according to claim 19, wherein each $n_i = 2^i$.

22. A system for recommending content to a user, for use with a pool of candidate resources each having a respective document summa identifying a respective plurality of concepts considered represented in the candidate resource and a relative strength by which each concept is considered associated with the candidate resource, the system comprising:
- memory;
- a data processor coupled to the memory, the data processor configured to:
- store in a database a user profile identifying a plurality of concepts considered of interest to the user, each in conjunction with a relative strength by which the concept is considered of interest to the user;
- for a document currently being consumed by the user, develop a current document summary identifying a plurality of concepts considered represented in the document and a relative strength by which each concept is considered associated with the document;
- blend the user profile with the current document summary to develop a blended user profile;
- search a database for documents having document summaries which match a profile determined in dependence upon the blended user profile,
- prune from the pool each given one of the candidate resources whose first $n_1$ concepts, in order of relative strength in the document summary for the given resource, does not match the first $n_1$ concepts identified in the blended user profile in order of relative strength in the blended user profile; and
- present towards the user a list of resources in dependence upon the pruned pool,
- where $n_1$ is a predetermined positive integer.

23. A system according to claim 22, wherein each of the concepts identified in either the user profile or the current document or both is identified by a normalized term in combination with a usage attribute identifying a way in which the term is used.

24. A system according to claim 22, wherein developing a current document summary comprises:
- identifying a plurality of the concepts used in the document currently being consumed;
- scoring a quality of each usage of the identified concepts in the document currently being consumed; and
- developing, in dependence upon the quality scores for each given one of the identified concepts, a feature strength for the concept as used in the document currently being consumed, the document summary indicating each of the concepts in the plurality of concepts in conjunction with its feature strength.

25. A system according to claim 22, wherein blending the user profile with the current document summary comprises, separately for each given one of a plurality of concepts included in both the user profile and the current document summary, averaging the relative strength identified for the given concept in the user profile with the relative strength identified for the given concept in the current document summary, each weighted by a respective blend factor.

26. A system according to claim 25, wherein the blend factor is the same for all concepts in the plurality of concepts included in both the user profile and the current document summary.

27. A system according to claim 22, wherein blending the user profile with the current document summary comprises, separately for each i'th one of a plurality of concepts included in both the user profile and the current document summary, determining a blended feature strength given by a blend factor F times the relative strength identified for the given concept in the user profile, plus (1−F) times the relative strength identified for the given concept in the current document summary.

\* \* \* \* \*